Oct. 8, 1963                R. J. COFFELT                3,106,152
                         CONTINUOUS FRUIT PRESS
Filed Oct. 18, 1961                                    5 Sheets-Sheet 1

INVENTOR.
ROBERT J. COFFELT
BY *Lothrop r West*
ATTORNEYS

Oct. 8, 1963 R. J. COFFELT 3,106,152
CONTINUOUS FRUIT PRESS
Filed Oct. 18, 1961 5 Sheets-Sheet 4

INVENTOR.
ROBERT J. COFFELT
BY
ATTORNEYS

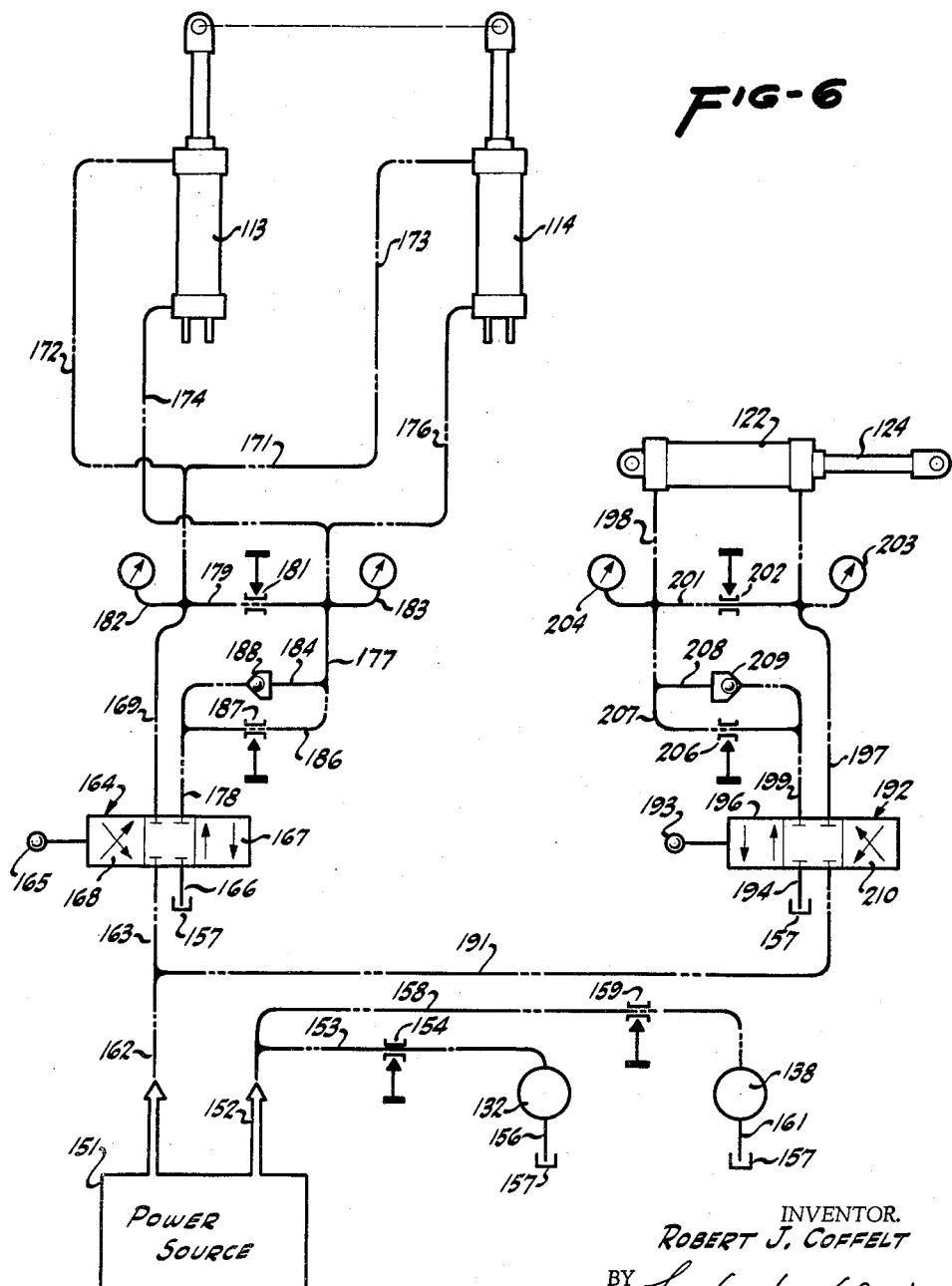

United States Patent Office 3,106,152
Patented Oct. 8, 1963

3,106,152
CONTINUOUS FRUIT PRESS
Robert J. Coffelt, Davis, Calif., assignor to The Regents of The University of California, Berkeley, Calif.
Filed Oct. 18, 1961, Ser. No. 145,886
4 Claims. (Cl. 100—118)

My invention relates to devices for expression of liquid or juice from various different materials, particularly fruit such as grapes, although it has also been successfully utilized in connection with other liquid expressing operations; for example, the release of liquids from fish parts and the like. The general designation herein of a fruit press is intended only to point out the present major usage of the equipment and is to include, as well, other similar pressure extractions of liquids from various materials.

In its chief current application the mechanism is especially adapted to the expression of juice from wine grapes. It is still customary to produce much of the grape juice utilized in wine making in a batch process. This is relatively costly and slow and is not necessarily productive of the expression of a maximum amount of liquid nor of a liquid of the best quality.

It is therefore an object of the invention to provide an improved fruit press.

Another object of the invention is to provide a fruit press which operates continuously rather than in a batch method so that there is an uninterrupted production of juice from the fruit introduced into the machine.

Another object of the invention is to provide a fruit press effective to increase the yield of juice from the particular material being processed.

Another object of the invention is to provide a continuous fruit press effective to afford the expression of juice of a high quality.

Another object of the invention is to provide a continuous fruit press readily achieving all of the requisite sanitary standards and simple and effective to use.

Another object of the invention is to provide a continuous fruit press which can easily be varied in its various parts and in its operation to accommodate itself to different materials to be treated.

A still further object of the invention is to provide a continuous fruit press that is readily applicable to a mechanized procedure in handling various fruits, particularly grapes.

Other objects together with the foregoing are attained in the embodiment of the invention described in the accompanying description and illustrated in the accompanying drawings in which:

FIGURE 6 is a hydraulic diagram showing the mechanism and interconnections of the hydraulically operated portions of the structure.

Figure 1:
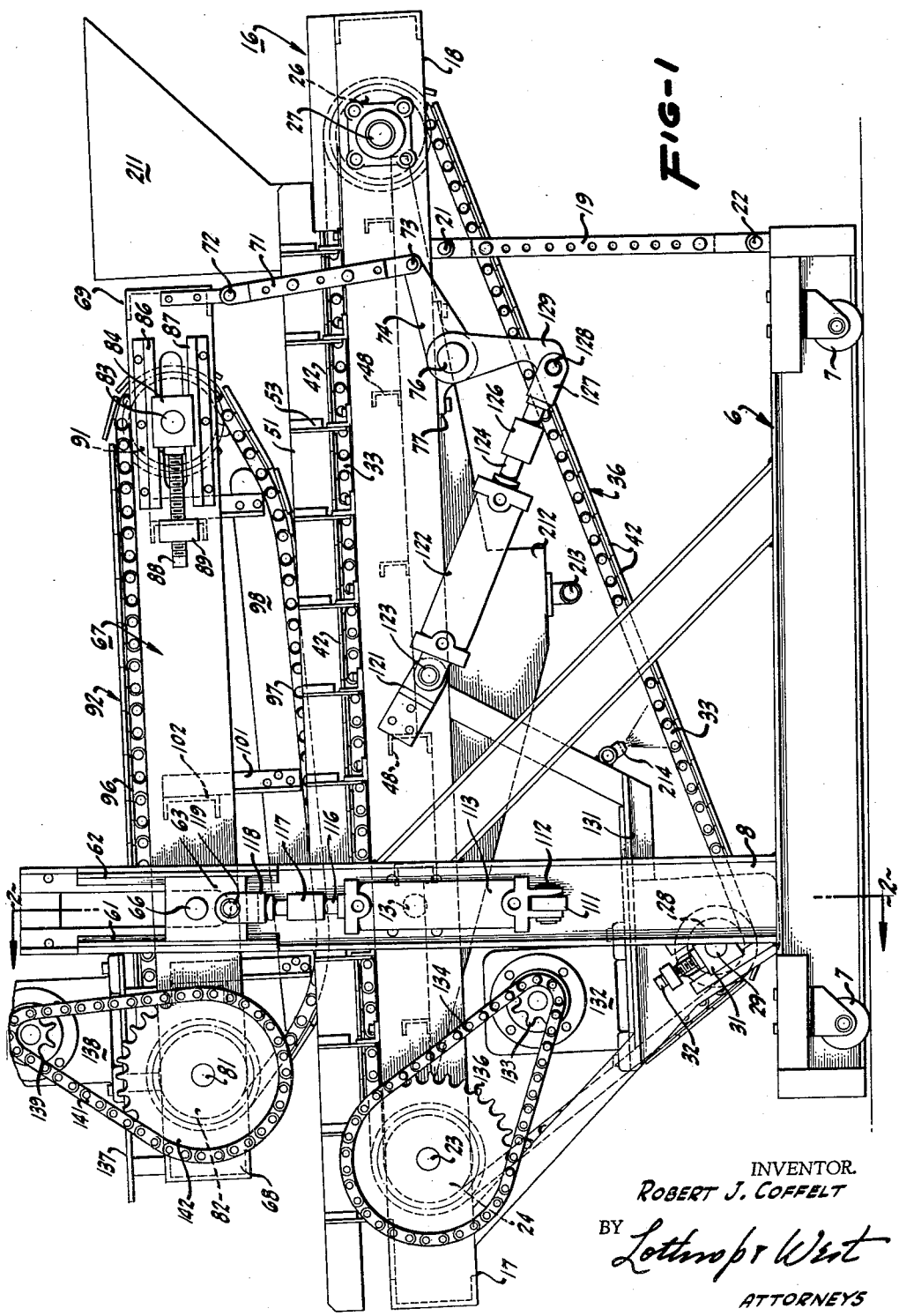
FIGURE 1 is a side elevation of one form of continuous fruit press constructed pursuant to the invention.
Figure 2:
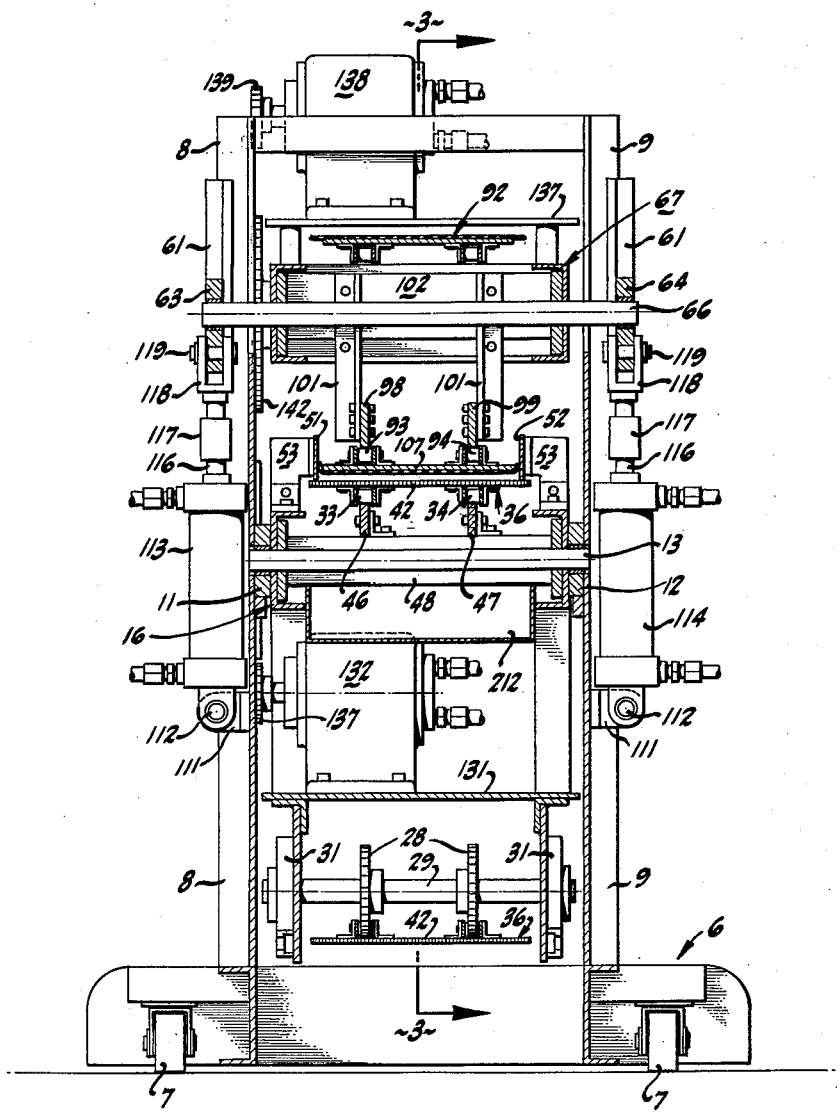
FIGURE 2 is a cross section on a vertical transverse plane of the structure shown in FIGURE 1, the plane of section being indicated by the line 2—2 of FIGURE 1.

While the continuous fruit press of the invention is susceptible to utilization in many different environments and can be varied in many ways to accommodate itself to the particular operations and results desired, it has successfully been incorporated particularly for the expression of grape juice from wine grapes. As they are at present furnished, wine grapes are available in bulk with the berries attached to the various stems in bunches and the present mechanisms is especially designed to handle the grapes in bulk and in bunches just as they are received from the vineyard.

The press is portable so that it can be utilized in a number of different locations in a mechanized production set-up. The structure includes a base frame 6 conveniently fabricated of various structural shapes welded together and having a number of casters 7 to support the mechanism on the floor. The base frame 6 includes a pair of uprights 8 and 9 arranged opposite each other in the forward zone of the base frame 6 and serving as suitable mounts for much of the mechanism. The uprights 8 and 9 are conveniently cross connected and braced so that with the remainder of the base frame they afford a firm mounting for the press.

At points substantially midway of the height of the uprights 8 and 9 they are provide with bearing blocks 11 and 12 to receive a cross shaft 13 affording a first horizontal pivot mounting. Secured to the cross shaft and thereby pivotally related to the base frame 6 is a lower sub-frame 16. This is fabricated of structural shapes, particularly channels, and has a leading portion 17 extending forwardly beyond the shaft 13 and a rearward portion 18 extending for a substantial distance rearwardly of the pivot shaft. The lower sub-frame 16 is generally situated approximately horizontally. It can be inclined at various different angles and held at the selected inclination by appropriately fastening adjustable overlapping support struts 19 disposed at either side of the lower sub-frame 16. The struts 19 are connected by pivot connections 21 to the lower sub-frame and also are connected by pivot connections 22 to the base frame 6. The lower sub-frame is shown inclined downwardly and forwardly at a three degree angle. This has been found in practice to be appropriate for the expression of juice from grapes although the angle can be adjusted to a steeper pitch or even can be set so that there is a downward inclination in the opposite direction.

Appropriately disposed on the lower sub-frame 16 are various pairs of sprockets. In the portion 17 of the lower sub-frame there is mounted a cross shaft 23 carrying a pair of sprockets 24 fixed thereon. A similar pair of sprockets 26 is disposed on the portion 18 of the lower sub-frame being mounted on an appropriately journalled cross shaft 27. A pair of idlers 28 (either plain wheels or sprockets) is carried by a cross shaft 29 mounted in bearing blocks 31 positioned by an adjusting mechanism 32 disposed in the lower portion of the lower sub-frame 16.

Engaging the pairs of sprockets 24, 26 and 28 are parallel chains 33 and 34 included in a lower pressure belt generally designated 36. The chains are trained around the sprockets in a substantially triangular path to afford an approximately horizontal upper run and appropriately angled return runs, the tension in the chains being set by appropriate manipulation of the adjustments 32.

The chains 33 and 34 afford a conveyor and support for pressure plate structures. At appropriate intervals the chains carry support brackets 38 and 39 extending laterally and pierced to receive removable fastenings 41. These secure in place a related one of a series of relatively narrow transverse pressure plates 42. Each plate is approximately rectangular in plan, extends for substantially the entire distance between the sides of the lower sub-frame 16 and is fabricated of any of several materials. It is important that the plate material be stiff, be resistant to the fruit liquids and acids being handled and that the material be readily cleaned and have a high degree of sanitation. Stainless steel is appropriate as are certain of the relatively stiff plastics. Each pressure plate 42 is provided with a number of through passages 43 affording passages for the expressed juice.

In order to maintain the position and stiffness of the various pressure plates 42 the chains 33 and 34 are backed up or supported by appropriate rails 46 and 47 carried by cross bars 48 supported on the side members of the lower sub-frame 16. The rails 46 and 47 are engaged by rollers included in the chains 33 and 34 and at their ends are cammed or contoured to afford smooth engagement and disengagement of the chains 33 and 34 and the support rails. This arrangement affords a firm pressure belt in its upper run having the adjacent plates 42 in substantial edge-to-edge contact. The spaces between the adjacent plates 42 are at least as narrow as the diameter of the various openings 43. The various plates 42 are also sufficiently stiff and are well enough supported so that virtually a planar pressure table is afforded despite the fact that a number of movable elements are involved.

Cooperating with the upper surfaces of the plates 42 in the upper run of the lower pressure belt are side plates 51 and 52 at their lower edges held in a close fit with the pressure plates and held in upright position by a number of brackets 53 and 54 supported on the side rails of the lower sub-frame 16. The side plates 51 and 52 extend for substantially the full length of the lower sub-frame and with the upper run of the lower pressure belt constitute a substantially liquid-tight partial enclosure open at its opposite ends and at the top.

Means are provided to position an upper pressure belt to cooperate with the lower pressure belt. The uprights 8 and 9 near their upper ends have guides 61 and 62 forming tracks for movable journal blocks 63 and 64. These blocks carry a cross shaft 66 on which is mounted an upper sub-frame 67 constituted of various structural shapes appropriately secured together. The upper sub-frame 67 is tiltable or rockable about the axis of the shaft 66 and has one end 68 extending to one side of the uprights and another, leading end 69, extending from the other side of the uprights. The upper sub-frame 67 and the lower sub-frame 16 are approximately in vertical registry. Support bars 71 are connected at their upper ends by pivots 72 to the leading end of the upper sub-frame 67 and at their lower ends are connected by pivots 73 to support arms 74 secured on a cross shaft 76 carried by pillow blocks 77 on the lower sub-frame 16. The straps 71 are overlapped so as to be adjustable at intervals so that the pivot mountings 72 and 73 can be set at any desired distance apart.

Mounted on the upper sub-frame 67 near the end 68 thereof is a cross shaft 81 appropriately journalled and carrying a pair of sprockets 82. Similarly, a cross shaft 83 is disposed near the other end portion 69 of the upper sub-frame and is mounted in journal blocks 84 longitudinally movable in guides 86 and 87. The blocks 84 are readily positionable by means of adjusting screws 88 engaging the block and carried in nuts 89 fixed on the upper sub-frame 67. Fast on the shaft 83 is a pair of sprockets 91 comparable with the sprockets 82. An upper pressure belt 92 includes a pair of roller chains 93 and 94 trained around the pairs of sprockets to form an upper run 96 and a lower run 97.

Figure 3:
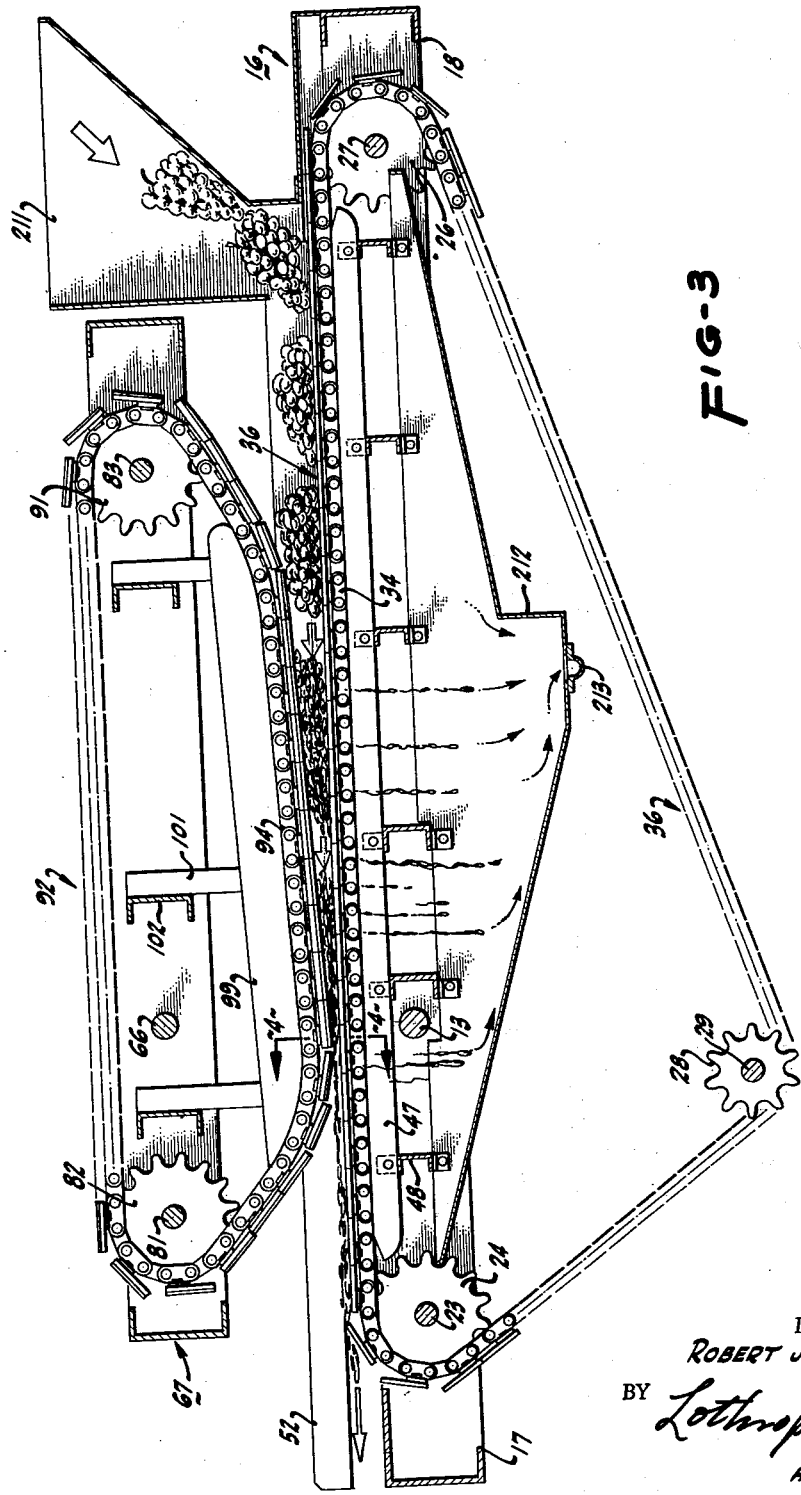
FIGURE 3 is a cross section on a vertical longitudinal plane through the structure shown in FIGURES 1 and 2, the plane of section being indicated by the line 3—3 of FIGURE 2.
Figure 4:
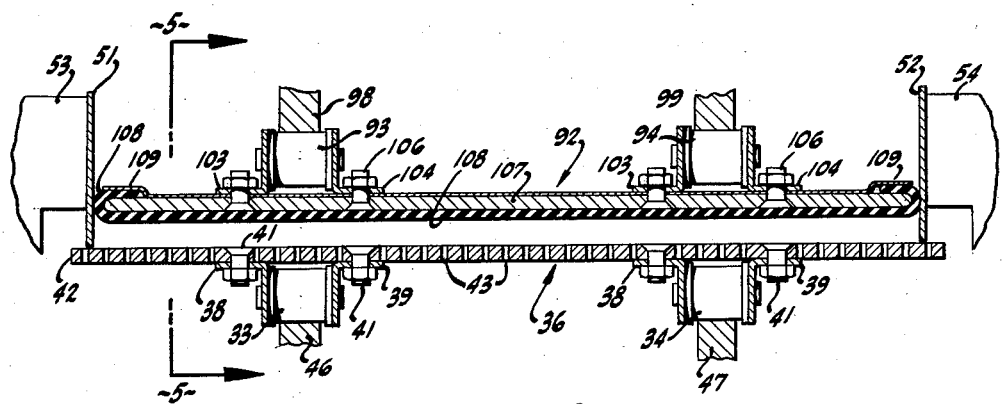
FIGURE 4 is a detailed cross section the plane of which is indicated by the line 4—4 of FIGURE 3, the scale being somewhat enlarged.
Figure 5:
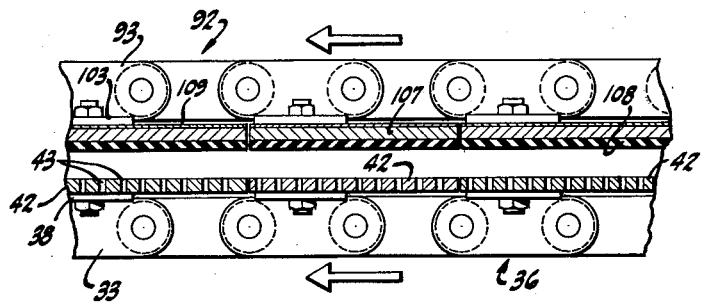
FIGURE 5 is a cross section the plane of which is indicated by the line 5—5 of FIGURE 4.

The contour or envelope of the upper pressure belt 92 is established particularly in the lower run thereof by rails 98 and 99 held by brackets 101 depending from cross members 102 forming part of the upper sub-frame 67. The rails 98 and 99 are engaged by the rollers of the chains 93 and 94 and have generally rectilinear edges merging with curved ends so that the lower run of the upper pressure belt takes substantially the convexly curved contour as shown in side elevation in FIGURES 1 and 3. In the usual orientation of the parts the lower run of the upper pressure belt and the upper run of the lower pressure belt afford a throat converging from the inlet toward the outlet of the machine. The operating position of the lower run of the upper pressure belt is such that the upper belt for much of this portion of its length operates between and in close engagement with the side walls 51 and 52.

The conveyor chains 93 and 94 include brackets 103 and 104 having fastenings 106 securing upper pressure plates 107 removably in position. The upper plates are imperforate but otherwise are virtually duplicates of the lower pressure plates 42, being relatively stiff and approximately rectangular in plan. They are usually made of the same material as the lower plates 42 but in addition are provided with a covering. Usually this constitutes a layer 108 of rubber-like material sufficiently soft or yieldable so that it can be curved around the contoured ends of the individual plates 107. This affords an exposed rubbing surface 108 in close engagement with the adjacent one of the side walls 51 and 52. The layer 108 is held in place by the clamping action of clip plates 109 having offset ends and secured between the brackets 103 and the plate 107 by the fasteners 106. The transverse edges of the successive layers 108 are in close proximity, affording very nearly a fluid-tight joint when the adjacent plates 107 are substantially coplanar.

Hydraulic means are provided for vertically moving the blocks 63 and 64 which position the pivot shaft 66 of the upper sub-frame. Each of the uprights 8 and 9 is provided with a block 111 carrying a cross pin 112 for mounting one of a pair of hydraulic jacks 113 and 114. The jack 113 (and the two sides are alike) includes a reciprocable piston rod 116 connected to an adjustable union 117 engaging an upper clevis 118. A pivot pin 119 fastens the clevis 118 to the lower end of the adjacent block 63. When the jack 113 is contracted, the block 63 is in its lowermost position, whereas when the jack is expanded to any selected amount the block 63 rises accordingly. Since the two jacks 113 and 114 operate in unison and because of the crosstie afforded by the shaft 66, the pivot axis of the upper sub-frame is uniformly raised and lowered as the jacks 113 and 114 are actuated. With this arrangement pressure can be exerted in an upward direction or in a downward direction and in any desired amount.

As and additional mechanism for positioning the upper sub-frame 92, the lower sub-frame 16 carries a bracket 121 supporting a hydraulic jack 122 by means of a pivot pin 123. The jack 122 includes a piston rod 124 connected by a union 126 to a clevis 127. A pivot pin 128 joins the clevis 127 to a lever arm 129 fast on the cross shaft 76. When the jack 122 is in its retracted condition, the lever 129 is in its extreme leftward position as seen in FIGURE 1. By reason of the resulting position of the cross shaft 76, the two supports 71 are in their lowermost position, thus holding the leading or feeding end 69 of the upper sub-frame 67 in its lowermost attitude or at the flattest angle. When the jack 122 is expanded to any selected amount, the cross shaft 76 is correspondingly rotated into its new position, the supporting straps 71 are lifted and the leading end 69 of the upper sub-frame 67 is correspondingly lifted to occupy a steeper angle. By appropriately manipulating the pair of jacks 113 and 114 and also the jack 122 it is possible to dispose the upper sub-frame 67 at any selected distance from or at any attitude with regard to the lower sub-frame 16. By operating the jack 122 alone, the angle of convergence between the lower run of the upper pressure belt and the upper run of the lower pressure belt can be varied at will within the range of the equipment.

A separate drive is afforded for the lower pressure belt and a separate drive is afforded for the upper pressure belt. Conveniently situated on the lower sub-frame 16 on suitable support angles 131 is a hydraulic motor 132 carrying a chain sprocket 133. A drive chain 134 not only encompasses the sprocket 133, but also is in engagement with a sprocket 136 fast on the shaft 23 to which the sprockets 24 are also firmly engaged. Upon rotation of the motor 132 the lower pressure belt is advanced from right to left as seen in FIGURE 1, the speed of advance being variable by changing the speed of the hydraulic motor 132. Somewhat similarly the upper subframe 67 is provided with a mounting 137 for a hydraulic motor 138 having a drive sprocket 139. A chain 141 not only engages the sprocket 139 but is also trained around a sprocket 142 fast on the drive shaft 81 to which the pair of sprockets 82 are likewise secured. When the motor 138 is appropriately energized, the upper pressure belt is advanced so that the lower run moves from right to left as seen in FIGURE 1. The speed of the motor 138 can be the same as or different than the speed of the motor 132 so that the lower run of the upper pressure belt and the upper run of the lower pressure belt can advance at the same speed or at different speeds.

For operating the various hydraulic instrumentalities, hydraulic fluid under pressure is received from a source 151 such as a standard pressure set including an appropriately driven hydraulic pump with a pressure regulated output. From the power source 151 hydraulic fluid under pressure is conducted by flexible hoses or the like in the direction of the arrow 152 into a conduit 153 leading through a speed adjusting orifice 154 to the hydraulic motor 132. The discharge from the motor 132 is through an outlet 156 back to a conventionally represented reservoir 157 or sump. By appropriately varying the position of the adjusting valve 154, the speed of the motor 132 can be regulated. A similar conduit 158 extends from the pressure source 151 through a variable valve 159 to the motor 138, the outflow from which goes to the reservoir or sump 157 through a pipe 161. By adjusting the valve 159 the speed of the motor 138 can be controlled.

In a parallel hydraulic system a conductor 162 leading from the same or a similar source 151 extends through a conduit 163 to a valve 164. This has a manual controller 165 and is movable into any one of three diagrammatically illustrated positions. In the central position the valve is in a shut-off or return position in which there is no flow through the valve but only a shunt return through a pipe 166 to the reservoir or sump 157. When the valve is shifted to the left as seen in the diagram, the connections 167 are made effective and there is parallel pressure and return flow directly through the valve. When the valve is shifted to an opposite extreme position, the connections 168 are brought into effect and the pressure and return connections are then crossed.

When the valve is in position with the connections 167 in place the pressure flow is continued through a duct 169 leading to a branch conduit 171, one part of which extends to the jack 113 and the other branch of which extends to the jack 114. Thus, parallel flow is provided for the jacks the pistons of which are mechanically connected. When the jacks are actuated, return flow from the low pressure ends of the cylinders is through two branch conduits 174 and 176 to a main conduit 177. This is connected to a conduit 178 so as to be joined, in the valve position mentioned, to the pipe 166 leading to the sump 157. With these connections the jacks are urged in one direction by hydraulic pressure. When the valve 164 is moved to its opposite extreme position, then the connections are crossed and the jacks are moved in the opposite direction.

During most of the operation of the structure, it is not desired that the jacks move the mechanism to a set position and hold it there. Rather, it is desired that the jacks exert a set or predetermined pressure on the material being handled. For this reason, there is connected between the duct 169 and the conduit 177 a shunt conduit 179 incorporating a variable restriction 181. Pressure gauges 182 and 183 afford indications of pressure on opposite sides of the restriction 181. Interposed in the conduits 177 and 178 are branch pipes 184 and 186. The latter has a variable valve restriction 187 therein while the conduit 184 contains a one-way check valve 188. By appropriate relative setting of the variable valves 181 and 187 a desired pressure difference can be maintained at the opposite ends of the hydraulic jacks 113 and 114. This pressure difference affords the predetermined or set value of downward pressure to be exerted upon the rearward portion of the upper sub-frame 67.

Since it is not desired to regulate the pressure in an upward direction, the one-way check valve 188 permits fluid to flow from the pressure line 163 through the cross connection 168, when the valve 164 is so shifted, into the conduit 178 and instead of being restricted by the variable orifice 187 the flow is freely through the then open check valve 188 into the line 177 and into the lower end of the hydraulic jacks 113 and 114 so that there can be a quick lifting action of the upper sub-frame 67.

In a comparable fashion the pressure conduit 162 leads to a pressure conduit 191 extending to a valve 192 having a manual controller 193. The valve has an intermediate position in which flow from the line 191 does not extend through the valve but rather is bypassed through a return line 194 to the sump 157. When the valve is shifted to the right as seen in FIGURE 6, there is interposed a straight through connecting portion 196. Flow from the pressure line 191 under those conditions is then into a pressure conduit 197 to the rod end of the jack cylinder 122. This pressure tends to urge the piston rod 124 inwardly and to exert downward force on the upper sub-frame 67. When the piston rod 124 is so moved, the return flow from the jack 122 is into a conduit 198 extending to a conduit 199 rejoining the valve 192 and through such valve into the sump 157.

It is desired to maintain a pressure on the opposite ends of the jack 122 so as to have a net predetermined force exerted downwardly on the upper sub-frame 67. Between the conduits 197 and 198 there is a shunt line 201 incorporating a manually variable restricting valve 202. Appropriate gauges 203 and 204 are provided so that the pressure existing momentarily within the lines 197 and 198 can be observed. Also there is provided a variable restricting valve 206 interposed in a line 207 connecting the conduit 198 and the conduit 199. By appropriately adjusting the restrictions 202 and 206 there can be established any desired pressure conditions at the opposite ends of the jack 122 with a resulting net pressure downwardly on the piston rod 124.

As this regulated pressure is exerted only in a downward direction, there is provided a shunt conduit 208 extending between the conduits 198 and 199 in parallel with the conduit 207 and containing a one-way check valve 209. When the conduit 197 serves as a pressure line and the conduit 198 serves as a return line, the check valve 209 is closed and the pressure on the piston rod 124 depends on the relative adjustment of the restrictions 202 and 206. When the valve 192 is shifted to its opposite extreme position with the cross connection 210 in place, then the conduit 199 serves as a pressure line and the conduit 197 is the return line. Under those conditions the check valve 209 is open so that the restriction 206 is not effective and there is a rapid or quick upward force on the upper sub-frame 67.

In the operation of this mechanism, grapes or comparable material are put into a hopper 211 which is mounted on the lower sub-frame 16 adjacent the forward end of the lower pressure belt and spanning the space between the side walls 51 and 52, the lower opening of the hopper being slightly above the upper run of the lower pressure belt. Bunches of grapes discharge freely from the hopper onto the lower pressure belt and are carried forward by the movement of that belt. They encounter the downwardly and forwardly inclined converging portion of the lower run of the upper pressure belt. The grapes are engaged and moved forwardly by contact top and bottom and are squeezed and pulled over the side walls 51 and 52. The grape volume is gradually decreased as the upper pressure belt and lower pressure belt gradually converge. Since the upper belt is vertically restrained front and rear by hydraulic mechanisms, the pressure in each of which is separately and carefully controlled, the downward or squeezing pressure on the grapes is likewise carefully controlled despite instantaneous variations in the height or bulk of material being handled. The pressures are maintained at a value great enough to expel the juice from the grapes rather uniformly.

The juice cannot escape upwardly because of the effective seal made not only at the ends 108 of the upper plates 107 but also between the successive plate edges. The juice has a ready egress through the openings 43 in the lower plates 42 and passes through such openings and falls into a sump tank 212 mounted on the lower sub-frame 16. The sump tank 212 generally converges downwardly to an outlet duct 213 leading usually through a flexible hose (not shown) to a point for subsequent handling. The pressures as established by the hydraulic mechanisms are maintained as the grapes traverse the machine.

The volume of the remaining solid materials is compacted to as small a compass as desired and eventually the remaining material after the juice has been expressed travels in a diverging discharge portion of the two pressure belts and eventually rounds the discharge or far end of the lower pressure belt being released therefrom in any convenient manner for further disposition.

The upper pressure belt simply completes its circuit by returning through the upper run for further recycling since it has only a minor amount of adhering juice, not enough to interfere in any fashion with the adjacent mechanism. The lower belt sometimes retains some portions of the solid material left after the juice has been expressed. Adhering material on the return, lower run of the lower pressure belt is dislodged by a water spray 214. The lower pressure belt 36 is thus cleared of any debris and is returned in clean condition around the sprockets 26 to pass again under the hopper 211 for subsequent use.

In accordance with the invention, the continuous fruit press can operate without interruption as long as material is fed into the hopper 211 and is permitted to discharge from the remote end of the machine. It is found in practice that by proper operation of the set hydraulic pressures upon the pressure belts and by adjusting and establishing the optimum conditions not only of working angle of the lower pressure belt but also of the upper belt with respect thereto and also of the degree of convergence of the belts toward each other that an improved yield of high quality juice is had. At the end of a protracted run, the mechanism can readily be cleaned and put in condition either for storage or for future use on the same or other materials. A flexible, adaptable, effective and improved device has therefore been afforded.

What is claimed is:

1. A continuous fruit press comprising a base frame, a lower sub-frame, a first horizontal pivot connection between said base frame and said lower sub-frame, means for holding said base frame and said lower sub-frame at a selected pivoted position, a first plurality of sprockets on said lower sub-frame, a lower pressure belt trained around said first plurality of sprockets and having a substantially horizontal run, a pair of journal blocks, means for mounting said journal blocks for lifting and lowering movement on said base frame, an upper sub-frame, a second horizontal pivot connection between said journal blocks and said upper sub-frame, a second plurality of sprockets on said upper sub-frame, an upper pressure belt trained around said second plurality of sprockets and having a substantially horizontal run, means on said base frame and engaging said journal blocks for lifting and lowering said upper sub-frame, means on said lower sub-frame and engaging said upper sub-frame for pivoting said upper sub-frame relative to said journal blocks, means on said lower sub-frame for driving said lower pressure belt, and means on said upper sub-frame for driving said upper pressure belt.

2. A continuous fruit press comprising a base frame, a lower sub-frame, means for pivotally mounting said lower sub-frame on said base frame, means for holding said sub-frame in a selected pivotal position relative to said base frame, a first plurality of sprockets on said lower sub-frame, a lower pressure belt trained around said first plurality of sprockets and having a horizontal run with straight side edges, side walls upstanding on said lower sub-frame and engaging said side edges, an upper sub-frame, means for mounting said upper sub-frame on said base frame above said lower sub-frame and for vertical and pivotal movement relative to said base frame, a second plurality of sprockets on said upper sub-frame, an upper pressure belt trained around said second plurality of sprockets and having a substantially horizontal run in part disposed in engagement with said side walls, means for driving said upper and said lower pressure belts, and means for setting the position of said upper sub-frame relative to said lower sub-frame and for urging said upper sub-frame toward said lower sub-frame with a predetermined pressure.

3. A continuous fruit press comprising a base frame, a lower sub-frame, means for pivotally mounting one end portion of said lower sub-frame on said base frame, means for holding the other end portion of said lower sub-frame in a selected pivotal position relative to said base frame, a perforate lower pressure belt having a substantially horizontal run, means for mounting said lower pressure belt on said lower sub-frame for advancement relative thereto, means for so advancing said lower pressure belt, an upper sub-frame, means for mounting one end portion of said upper sub-frame on said base frame above said lower sub-frame and for vertical and pivotal movement relative to said base frame, an upper pressure belt having a substantially horizontal run in confronting relationship with the horizontal run of said lower pressure belt, means for mounting said upper pressure belt on said upper sub-frame for advancement relative thereto, means for so advancing said upper pressure belt, means connected to said upper sub-frame and to said lower sub-frame for mounting the other end of said upper sub-frame on said lower sub-frame and for setting the position of said upper sub-frame relative to said lower sub-frame and for urging said upper sub-frame toward said lower sub-frame with a predetermined pressure, and said advancing means and said mounting, setting and urging means being hydraulic.

4. A continuous fruit press comprising a base frame, a lower sub-frame, means for pivotally mounting said lower sub-frame on said base frame, means for holding said lower sub-frame at a selected pivoted attitude on said base frame, a lower pressure belt having openings therein, means for mounting said lower pressure belt on said lower sub-frame with a substantially horizontal run, an upper sub-frame, means for pivotally mounting said upper sub-frame on said base frame, an upper pressure belt, means for mounting said upper pressure belt on said upper sub-frame with a run converging toward said substantially horizontal run, means for substantially enclosing the sides of said converging runs of said pressure belts, hydraulic pressure means including a jack having a cylinder mounted on one of said subframes and having a piston mounted on the other of said subframes for urging said pressure belts toward each other, means for feeding fruit to be pressed into the space between said converging runs and said enclosing means, and means beneath said substantially horizontal run for receiving juice expelled from said fruit.

References Cited in the file of this patent

UNITED STATES PATENTS

| | | |
|---|---|---|
| 639,797 | Walters | Dec. 26, 1899 |
| 1,153,103 | Neale | Sept. 7, 1915 |
| 2,490,381 | Shields | Dec. 6, 1949 |
| 2,554,988 | Hollis | May 29, 1951 |